США005397754A

United States Patent [19]
Iannicelli et al.

[11] Patent Number: 5,397,754
[45] Date of Patent: Mar. 14, 1995

[54] METHOD OF BRIGHTENING KAOLIN CLAY BY THERMAL OXIDATIVE DECARBOXYLATION OF ORGANIC CONTAMINANTS

[75] Inventors: Joseph Iannicelli, Jekyll Island; John T. Williamson, Milledgeville, both of Ga.

[73] Assignee: IMPEX, Milledgeville, Ga.

[21] Appl. No.: 139,150

[22] Filed: Oct. 21, 1993

[51] Int. Cl.$^6$ ............................................. C04B 14/10
[52] U.S. Cl. ......................... 501/146; 106/486; 106/488; 252/186.28; 252/187.26; 252/188.22; 423/581; 423/584; 501/150
[58] Field of Search ............... 501/146, 150; 106/488, 106/486; 252/186.28, 187.26; 423/581, 584

[56] References Cited

U.S. PATENT DOCUMENTS

| | | | |
|---|---|---|---|
| 3,193,344 | 7/1965 | Iannicelli et al. | . |
| 3,589,922 | 6/1971 | Asdell et al. | 501/146 |
| 3,655,417 | 4/1972 | Chapman | 106/488 |
| 3,769,383 | 10/1973 | Hurst | 106/488 |
| 3,798,044 | 3/1974 | Whitley et al. | . |
| 3,826,365 | 7/1974 | Mercade | 209/5 |
| 3,853,983 | 12/1974 | Abercrombie, Jr. et al. | 423/113 |
| 3,961,971 | 6/1976 | Abercrombie, Jr. et al. | 423/132 |
| 3,974,067 | 8/1976 | Nott | 209/3 |
| 4,055,485 | 10/1977 | Nott | . |
| 4,097,372 | 6/1978 | Nott | 209/3 |
| 4,227,920 | 10/1980 | Chapman et al. | . |
| 4,281,799 | 8/1981 | Oder | 241/24 |
| 4,419,228 | 12/1983 | Cook et al. | 209/9 |
| 4,492,628 | 1/1985 | Young et al. | 209/5 |
| 4,781,298 | 11/1988 | Hemstock et al. | 209/3 |
| 4,851,048 | 7/1989 | Jones et al. | 106/446 |
| 4,971,629 | 11/1990 | Dunaway et al. | 106/468 |
| 4,976,789 | 12/1990 | Dunaway et al. | 106/488 |
| 4,997,550 | 3/1991 | Cobb et al. | 209/166 |
| 5,061,461 | 10/1991 | Sennett et al. | 423/112 |
| 5,085,707 | 2/1992 | Bundy et al. | 106/486 |
| 5,151,124 | 9/1992 | Rice | 501/150 |

Primary Examiner—Mark L. Bell
Assistant Examiner—Michael Marcheschi
Attorney, Agent, or Firm—Banner, Birch, McKie and Beckett

[57] ABSTRACT

A method for brightening kaolin contaminated with organic matter by decarboxylation treatment of an aqueous kaolin slurry. The decarboxylation is carried out by contacting the clay slurry with selected oxidizing agent in a pressurized reaction vessel at a temperature of 175°–500° C. without dehydroxylation (calcination) of the kaolin. Oxidizing agents include oxygen, ozone, hydrogen peroxide, and hypochlorite.

10 Claims, 1 Drawing Sheet

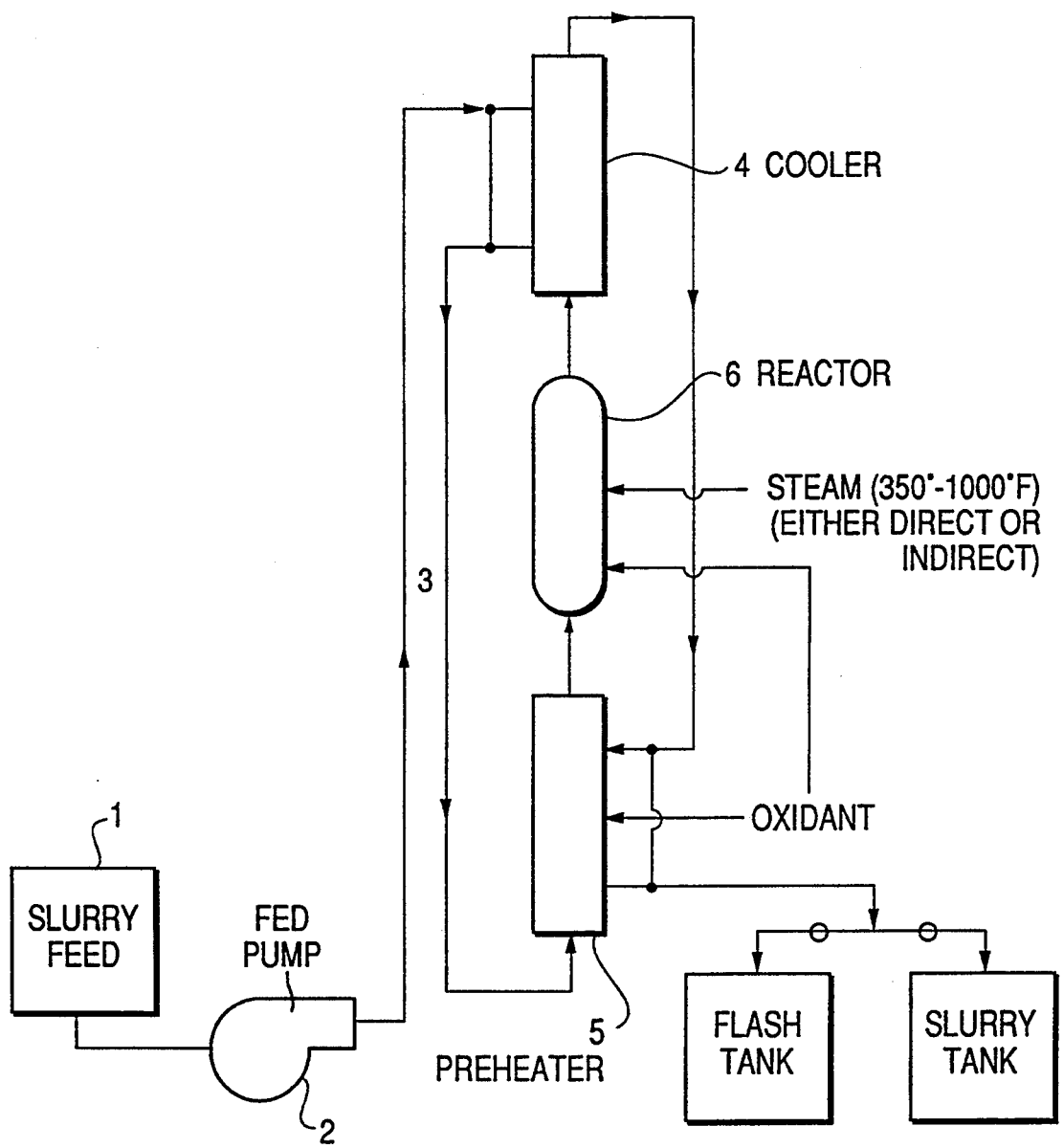

METHOD OF BRIGHTENING KAOLIN CLAY BY THERMAL OXIDATIVE DECARBOXYLATION OF ORGANIC CONTAMINANTS

FIELD OF THE INVENTION

The invention relates to a method of improving the brightness of kaolin clays. When mined, such clays typically are contaminated with inorganic and organic materials. In particular, the invention relates to a method for improving the brightness of kaolin clays having an organic contaminant content, generally expressed in terms of percent carbon, of typically between 0.03 to 0.30 percent based on the weight of clay, by decarboxylating the organic material at an elevated temperature in the presence of an oxidizing agent in a clay/water slurry.

BACKGROUND OF THE INVENTION

Kaolin is a naturally occurring hydrated aluminum silicate that is white in color. Kaolin clay as mined, however, is impure, being associated with a variety of contaminants. These contaminants cause the clay to be discolored. The observed discoloration of native kaolin clay is largely due to discoloring mineral contaminants of iron and titanium. Clays vary considerably in their color properties even when produced from mines in the same district or from different sites in the same deposit.

The value of kaolin clays in many applications depends on its color (whiteness) or brightness. A clay is often rejected as unsuitable for commercial use solely on the basis of color even though other physical properties, such as viscosity and particle size distribution, are within desired limits.

One of the largest consumers of clay, particularly kaolinite, is the paper industry. In the manufacture of paper, kaolin is commonly used as a low cost filler or coating pigment to improve the quality of the resulting product. In the absence of a filler, paper has a relatively poor texture due to discontinuities in the fibrous web. Coating clays not only improve the surface characteristics of the paper, but also improve the opacity and brightness of the paper. Usually, the paper industry requires a coating clay with G.E. brightness of 85 to 92.

Ultimate clay brightness is primarily dictated by the starting crude kaolin and the beneficiation to which the kaolin has been subjected. If, in addition to mineral contaminants, organic matter also is present, beneficiation of the clay to a desired brightness value becomes difficult, if not impossible. Minute amounts of organic matter may be sufficient to darken the treated clay appreciably. In addition to any darkening influence, organic matter also may have an extraordinary ability to inhibit or "poison" the leaching action of dithionite, a chemical commonly used to enhance clay brightness. As little as 0.03% organic matter expressed as carbon often may reduce or even eliminate the brightening effect of dithionite leaching. In this regard, large deposits of gray clays are known but such clays have only limited utility since it is not feasible to attain acceptable brightness levels using prior art beneficiation methods.

Various beneficiation methods, including floatation, flocculation, magnetic separation and chemical leaching, have been applied in various combinations by skilled kaolin technologists. Such kaolin beneficiation methods are disclosed, for example, in U.S. Pat. Nos. 3,193,344, 3,798,044, 3,826,365, 3,853,983, 3,961,971, 3,974,067, 4,055,485, 4,097,372, 4,227,920, 4,281,799, 4,419,228, 4,492,628, 4,781,298, 4,851,048, 4,997,550, 5,061,461, and 5,085,707, the disclosures of which are incorporated herein by reference.

It is well known that the brightness of clays usually is increased by fractionation to recover the finer particle fractions. However, this increase is insufficient to render the more discolored clays such as organically contaminated clays, commercially acceptable. In particular, such contaminants are often concentrated in the fine fractions.

It also is known to bleach refined clays with various chemicals to achieve satisfactory brightness levels. Leaching with chemicals such as zinc or sodium dithionite generally results in improved brightness of the beneficiated clay slurries, but typical increases of 2 to 5 brightness points are usually diminished or negated with gray clays as noted above. Brightness of clays can also be significantly improved by use of magnetic separation, froth flotation, and oxidation. However, prior art oxidation methods, including hypochlorite oxidation and ozonation used alone or in conjunction with dithionite leaching and magnetic separation, often do not attain the desired results. Ozonation is carried out on a large scale by all major kaolin producers in the United States. While these companies have developed a high level of technical and industrial practice, the current level of technology does not permit utilization of vast reserves of organically contaminated clays.

Although it is known that calcination of kaolin particulates at 600°–2000° F. oxidizes and destroys organic matter, and often improves brightness significantly, this treatment dehydroxylates the kaolin and interferes with many of the desired clay properties, particularly for coating applications. There currently exist vast reserves of organically contaminated kaolin clays which are discolored to a degree where no commercially practical process currently available to the art sufficiently improves clay brightness values to a level acceptable for using the clay as paper pigment or filler. Current coating clay brightness specifications require a G.E. brightness of about 85 to 92. Thus, a need in the art exists for a beneficialion method which can be used to brighten organically contaminated kaolin clays without dehydroxylating the kaolin, thereby rendering currently unusable reservoirs of clay usable, in particular, for use as a paper pigment or filler.

SUMMARY OF THE INVENTION

In accordance the practice of this invention, the beneficiation of clays from large reserves of organically contaminated crude clays to produce clay products having brightness values equal to or superior to high grade commercial products derived from higher quality crudes is made economically possible.

The invention is directed specifically to a method of improving the brightness of kaolin clays contaminated with both mineral and, particularly, organic materials. In particular, the invention is directed to a method for increasing the brightness of kaolin clays having an organic contaminant content, typically expressed in terms of a percent carbon content, of between about 0.03 to 0.30 percent based on the weight of the clay.

According to the method of the invention, the organic material in a clay slurry is oxidatively decarboxylated by heating the slurry in a pressurized reaction vessel at a temperature of above about 175° C. and typically between 200°–500° C. in the presence of an oxidizing agent.

BRIEF DESCRIPTION OF THE DRAWING

The FIGURE shows a reactor for practicing continuous thermal oxidative decarboxylation (TOD) in accordance with the invention.

DETAILED DESCRIPTION OF THE INVENTION

Wet processing of a kaolin clay in accordance with the present invention generally will include mixing the crude clay with water to produce a clay slurry. The slurry is degritted by removing particles larger than 325 mesh. The degritted slurry then is fractionated to recover one or more clay fractions of a desired particle size distribution. As is known in the art, filler clays may contain much larger amounts of coarser particles than paper coating clays.

In normal processing, following fractionation, a bleach, usually a hydrosulfite salt (e.g., zinc or sodium hydrosulfite), is then added to the slurry to bleach the clay and increased its brightness. Often such bleaching is one in combination with magnetic separation. Generally, water is then removed from the slurry, as needed, to produce a slurry having a solids content of between 5 and 70%. Clay dispersants such as sodium silicate, or condensed phosphate salt, or a polyacrylate salt, or a mixture of dispersants, often are added during the fractionation step and remain in the slurry through the various stages of operation. The dispersant has the effect of reducing the viscosity of the clay slurry.

In accordance with the present invention, to reduce organic contaminates, the aqueous kaolin slurry is subjected to a thermal oxidative decarboxylation (TOD) treatment. TOD of the kaolin is accomplished by contacting the clay slurry with selected oxidizing agents and heating the slurry in a pressurized vessel at a temperature of greater than 175° C. and preferably from above about 200° C. to about 500° for a time sufficient to decarboxylate the organic contaminants. Generally, the needed treatment time varies inversely with treatment temperature. Often a retention time of at least 10 minutes will be sufficient. The slurry may, if desired, be heated in stages until the desired maximum temperature is reached. Two or more stages may be used.

Oxidants for adding to the clay slurry include oxygen, ozone, hydrogen peroxide and hypochlorite. From 0.1 to 10.0% oxidizing agent based on dry clay weight is used. It has been discovered that oxidation of organic contaminates can be conducted at a high temperature in accordance with the invention to significantly improve brightness without dehydroxylating the kaolin by treating a slurry of the kaolin in a pressurized reactor.

It is recognized that conventional techniques, such as magnetic separation and bleaching with a reducing agent, may be performed before or after the slurry is subjected to the thermal oxidative decarboxylation of the invention.

The thermal oxidative decarboxylation of the present invention is distinct from calcination procedures in the prior art. In the first place, the treatment of the present invention is done in an aqueous clay slurry, rather than dry clay solids, as in the calcination process. Most importantly, the present invention does not cause clay dehydroxylation; while calcination is designed to dehydrate the clay. The TOD process of the present invention also differs from the dry roasting under an oxidizing atmosphere described in U.S. Pat. No. 3,961,971.

Generally, the invention is practiced on an aqueous kaolin clay slurry having a concentration between about 5 and 70% solids and more usually between about 10 and 50%. While it is preferred to use a degritted or fractionated kaolin slurry in the dispersed state, it is possible to use a crude clay and to use undispersed slurries as well. The process of this invention is most advantageously employed on a dispersed, degritted clay that has been previously subjected to magnetic separation.

The process of this invention can be conducted either batch-wise or continuously. For small scale operation, it is convenient to employ a two-gallon autoclave constructed from 316 stainless steel. A typical pressure rating of this kind of unit is about 500 psi at 230° C. (446° F.). Typically, a suitable oxidant such as hydrogen peroxide, oxygen, or sodium hypochlorite first is added to the clay slurry which then is sealed in the autoclave. The autoclave thereafter is heated by means of an electrically heated silicone bath. In a typical embodiment, the slurry is heated to a temperature of 200° C. held at that temperature for a period of one hour, and then allowed to cool to ambient temperature.

For larger scale operations, it is desirable to use a continuous reactor, for example, consisting of a stainless steel or titanium reaction vessel, generally tubular, which may be fitted with in line static mixers. As shown in the drawing figure, a kaolin slurry (1) is fed by means of a high pressure pump (2) to the reactor (3). The pump is used to obtain a pressure of 200–3000 psi in the reaction vessel. In large part, the pressure is dictated by the selected treatment temperature. It is preferred to maintain the clay slurry in its liquid state during treatment. Thus, the reaction pressure should be equal to or greater than the water vapor pressure at the treatment temperature. In a first pre-heating section for the reactor, the kaolin slurry is passed through a heat exchanger (cooler) (4) which, as shown, is heated by the treated product slurry discharged from the reactor, or alternatively, by a suitable heating fluid. The slurry is then pumped into a second pre-heater section (5) for the reactor where in the illustrative embodiment it is further heated by the discharged product stream. The slurry then is passed through the reaction vessel (6). The reactor is heated so that the slurry reaches a temperature above 175° C., and more usually between 200° C. and 1000° C. The reactor may be heated either directly, such as by introducing live steam at 200–3000 psi into the slurry, or indirectly. In the illustrated embodiment, the oxidant needed to facilitate the thermal oxidative decarboxylation is added to the clay slurry either just prior to or in the reactor vessel (6). The treated slurry then is cooled by heat transfer with the feed stream. Other heat exchange fluids, such as silicone, Dowtherm and the like may alternatively be used for any heat transfer step in carrying out the process. In the cooling section (4), the treated product slurry is cooled to a temperature below about 212° F. and the pressure is reduced to about 1 atmosphere while venting the oxidation products. In some instances, it may be possible or desirable to dispense with the illustrated cooling section and depressurize the hot reacted kaolin slurry through a nozzle into a suitable chamber such as a spray dryer.

The invention will be more fully understood by the following examples. All percentages are by weight unless otherwise indicated. Brightness was measured using the standard G.E. scale in accordance with TAPPI Procedure T 646 m-54. Particle size measurements were made in accordance with TAPPI Procedure T 649 sm-54. The expression E.S.D. refers to equivalent spherical diameter.

EXAMPLE 1 (COMPARATIVE)

A crude clay from the Sandersville area of Georgia (Sample 581) was dispersed in water at 40% solids using 0.15% tetrasodium pyrophosphate (TSPP) and screened on a 325 mesh screen. The minus 325 mesh fraction had a brightness of 78.2. This fraction was statically sedimented to furnish a minus 5 micron fraction with a brightness of 79.3. Conventional ambient temperature oxidation of this clay using sodium hypochlorite in an amount of 0.1% by weight of the clay solids over a period of 24 hours increased the brightness to 81.6. Magnetic separation further raised the brightness to 82.7 and a reductive bleach using 0.5% sodium dithionite (again on the basis of clay solids) gave a final brightness of 85.9, which is slightly below the typical coating brightness of 86.0 for this grade of clay.

EXAMPLE 2

The procedure of Example 1 was essentially repeated on the same crude clay except that the clay was subjected to the TOD process of the invention. Two liters of the magnetically processed clay obtained in Example 1 at 25% solids was treated with 500 ml of aqueous 3% hydrogen peroxide (15 g active $H_2O_2$) equal to 2.5% based on dry clay. This dispersed slurry previously had 0.2% Dispex N40 (sodium polyacrylate) and 0.1% TSPP (clay solids basis) added to it and had a pH of 7. The oxidant treated slurry was charged into a four liter stainless steel autoclave which was heated to 200° C. (about 392° F.) at 250 psi and held at that temperature for 1 hour. The slurry then was cooled to room temperature over 30 minutes (same as the heating period). The brightness of the treated clay was raised 1 point as a result of the above TOD treatment (i.e., from 82.7 to 83.7). Reductive leaching further raised the brightness of the clay 5 additional points (i.e., to 88.0). This represents a 3.1 point brightness improvement over the brightness achieved by the conventional processing described in Example 1. Thus, the initial brightness gain provided by the TOD process was further improved by the better response to reductive leaching indicating that a more complete reduction in organic matter was achieved by the TOD process.

EXAMPLE 3 (COMPARATIVE)

A sample of gray crude clay from Washington County, Ga. (286-48-29) was dispersed at 40% solids using 0.15% TSPP and screened on a 325 mesh screen. The minus 325 mesh fraction then was sedimented to furnish a minus 5 micron coating fraction having a particle size of 80% minus 2 microns and a G.E. brightness of 83.9. This coating fraction was given two passes (one minute per pass) through a PEM 5-inch magnetic separator yielding a non-magnetic clay fraction having a brightness of 85.5. Chemical leaching of this clay using 0.5% sodium dithionite furnished a product having a brightness of 86.1.

EXAMPLE 4

The procedure of Example 3 was repeated on the same crude clay. The second nonmagnetic fraction was instead subjected to thermal oxidative decarboxylation in accordance with Example 2. The treated clay product resulting from this treatment had a brightness of 88.7. Reduction leaching of this TOD-treated product with 0.5% sodium dithionite raised the G.E. brightness to 89.7, or an increase of 3.6 G.E. brightness points over the same crude clay processed by conventional means in Example 3.

EXAMPLES 5-10

A comprehensive series of tests on six crude gray days from Central and Eastern Georgia was conducted. Each clay was dispersed, degritted and fractionated to yield a coating clay having a particle size of 80% minus 2 microns or finer, and was given two, one-minute passes through a PEM 5-inch magnetic separator operating at 20 kilogauss. Half of each sample was processed by a conventional means, i.e., each sample was ozonated with 0.5% ozone (based on dry kaolin) and then leached with 0.5% sodium dithionite. These "control" samples are denoted in the Table by the numbers 286-89-5 through 286-891 -10.

After the magnetic separation step, the second half of each clay sample was subjected to the TOD process of the present invention by adding 2% hydrogen peroxide (active) based on weight of clay to the slurry and to a temperature of 400° F. for 1 hour at 250 psi. This clay then was cooled to ambient conditions and chemically leached with sodium dithionite (0.5%), filtered, and dried. These TOD-treated samples are designated in the Table by the numbers 286-89-5I through 286-89-10I. The schematic of the reactor used in this test series is shown in the FIGURE. Properties of the control and TOD produced clays are compared in Table 1:

TABLE 1

COMPARISON OF OZONATION VS. THERMAL OXIDATIVE DECARBOXYLATION

| FINAL PRODUCT | GE | L** | a*** | b**** | WHITENESS | ΔGE |
|---|---|---|---|---|---|---|
| 286-89-5 | 88.09 | 95.89 | −0.03 | 3.21 | 73.87 | |
| 286-89-5I* | 89.80 | 96.45 | 0.11 | 2.72 | 77.54 | 1.72 |
| 286-89-6 | 83.57 | 94.01 | 0.27 | 3.95 | 66.71 | |
| 286-89-6I | 88.40 | 95.05 | 0.20 | 3.04 | 74.91 | 4.83 |
| 286-89-7 | 84.17 | 94.02 | 0.29 | 3.50 | 69.10 | |
| 286-89-7I | 89.52 | 96.25 | 0.10 | 2.65 | 77.54 | 5.35 |
| 286-89-8 | 87.40 | 95.69 | 0.04 | 3.45 | 72.21 | |
| 286-89-8I | 87.83 | 95.65 | 0.09 | 3.11 | 74.02 | 0.43 |
| 286-89-9 | 83.39 | 93.68 | 0.42 | 3.24 | 69.96 | |
| 286-89-9I | 86.16 | 94.51 | 0.32 | 2.70 | 74.22 | 2.27 |
| 286-89-10 | 81.18 | 92.40 | 0.50 | 3.48 | 66.54 | |
| 286-89-10I | 87.60 | 95.23 | 0.18 | 2.60 | 76.03 | 5.80 |

*"I" samples by TOD
**lightness or grayness, highest values lightest
***redness (+) or greenness (−), lowest values best
****yellowness (+) or blueness (−), lowest values best Comparison of the results shown in Table 1 reveal that in every case the results of TOD processing were superior to conventional processing using ozone oxidation. The GE brightness advantage for the TOD treated clays ranged from a low of 0.43 to 5.8 brightness points after reductive bleaching. Normally an increase in brightness of 1–2 points is considered significant and economically important in kaolin final brightness. Of the six clays tested, all but one showed a brightness response exceeding one point and three of the six gave remarkable increases averaging over 5 points. This clearly shows the advantage of TOD processing to the best available technology on gray clays used in the kaolin industry today. Overall, the values of the TOD treated samples were superior.

EXAMPLE 11

The procedure of Example 2 was repeated using 30 grams of 50% hydrogen peroxide (2.5% based on dry clay). The final brightness was 88.2 or slightly higher than in Example 2.

EXAMPLE 12

The procedure of Example 2 was repeated except that the autoclave was heated to 200° C. and maintained for one hour, and then heated to 305° C. and maintained for an additional hour. The final brightness was 88.6.

EXAMPLE 13

The procedure of Example 2 was repeated except the autoclave was heated to 415° C. and maintained for one hour. The final brightness was 88.9.

EXAMPLE 14

The procedure of Example 2 was repeated except the autoclave was heated to 500° C. and maintained for 30 minutes. The final brightness was 90.1.

EXAMPLE 15

A sample of very low quality kaolin, known as the brown bed, from Vancouver, British Columbia, was beneficiated by conventional means and then by application of the TOD process. This kaolin had an extraordinarily low brightness of about 40 after degritting the crude clay a on 325 mesh screen. The kaolin was subjected to fractionation to produce a −10 micron coating fraction and this was passed through a magnetic separator for two passes producing a nonmagnetic clay fraction with a brightness of 42. Attempts to apply a reduction bleach directly to this nonmagnetic fraction did not improve brightness. A portion of the nonmagnetic fraction was treated initially by the TOD process using 1% sodium hypochlorite (active base) at 200° C. for a one hour period. The resulting TOD clay had a brightness of 61, or an increase of 19 points from the untreated material.

The above Examples herein are to be construed as merely illustrative and not a limitation of the scope of the present invention in any way. The embodiments of the invention in which an exclusive property or privilege is claimed are defined as follows.

We claim:

1. A method of improving the brightness of kaolin clay contaminated with organic material, comprising:
    a) mixing organically contaminated crude kaolin clay with water to produce an aqueous kaolin clay slurry;
    b) subjecting the slurry to thermal oxidative decarboxylation by heating the slurry in a pressurized reaction vessel in the presence of an oxidizing agent to a temperature of about 175° C. for a period of time sufficient to decarboxylate the organic contaminates whereby said organic contaminants are substantially removed from the kaolin clay;
    c) cooling and depressurizing the slurry; and
    d) recovering kaolin clay having improved brightness from the slurry.

2. The method of claim 1 wherein the organic contaminants of the contaminated clay, in terms of percent carbon, is from about 0.03 to about 0.30 percent based on the weight of the clay.

3. The method of claim 1 wherein said aqueous slurry of said kaolin clay contains 5 to 70% solids by weight.

4. The method of claim 1 wherein said oxidizing agent is selected from the group consisting of oxygen, ozone, hydrogen peroxide, sodium hypochlorite, sodium chlorite, lithium hypochlorite, sodium monopersulfate.

5. The method of claim 1 wherein the slurry is cooled to below 212° F. and the pressure is reduced to 1 atmosphere.

6. The method of claim 4 where the oxidant is oxygen, ozone or hydrogen peroxide.

7. The method of claim 1 further comprising subjecting the slurry to magnetic separation.

8. The method of claim 7 further comprising subjecting the slurry to reductive leaching using a hydrosulfite salt.

9. The method of claim 4 where the amount of oxidant is from b 0.1% to 10.0% based on dry weight of clay treated.

10. The method of claim 1 .wherein the oxidizing agent is introduced into the slurry and heated in two or more stages before reaching the maximum temperature.

* * * * *

UNITED STATES PATENT AND TRADEMARK OFFICE
CERTIFICATE OF CORRECTION

PATENT NO. : 5,397,754
DATED : March 14, 1995
INVENTOR(S) : Joseph Iannicelli, John T. Williamson It is certified that error appears in the above-identified patent and that said Letters Patent is hereby corrected as shown below:

Col. 8, In claim 1(b), line 12, please insert the word --above-- after the phrase "temperature of".

Col. 8, In claim 9, line 41, please delete the letter "b" which appears after the word "from".

Signed and Sealed this

Twentieth Day of June, 1995

Attest:

BRUCE LEHMAN

*Attesting Officer*  *Commissioner of Patents and Trademarks*